(12) United States Patent
Choi et al.

(10) Patent No.: US 10,802,199 B2
(45) Date of Patent: Oct. 13, 2020

(54) BACKLIGHT DEVICE, HOLOGRAPHIC DISPLAY INCLUDING THE SAME, AND METHOD OF MANUFACTURING HOLOGRAPHIC OPTICAL ELEMENT HAVING A MULTILAYERED STRUCTURE

(71) Applicant: SAMSUNG ELECTRONICS CO., LTD., Suwon-si (KR)

(72) Inventors: Chilsung Choi, Suwon-si (KR); Sunil Kim, Seoul (KR); Hoon Song, Yongin-si (KR); Jungkwuen An, Cheonan-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/691,091

(22) Filed: Aug. 30, 2017

(65) Prior Publication Data
US 2018/0136383 A1    May 17, 2018

(30) Foreign Application Priority Data
Nov. 11, 2016 (KR) .................. 10-2016-0150336

(51) Int. Cl.
*G03H 1/22* (2006.01)
*G03H 1/04* (2006.01)
(Continued)

(52) U.S. Cl.
CPC ............ *G02B 6/005* (2013.01); *G02B 5/32* (2013.01); *G02B 6/0023* (2013.01);
(Continued)

(58) Field of Classification Search
CPC ........ G02B 6/005; G02B 5/32; G03H 1/0408; G03H 1/2294; G03H 2001/2226
See application file for complete search history.

(56) References Cited

U.S. PATENT DOCUMENTS 6,175,431 B1 * 1/2001 Waldern .................. G02B 5/32
348/E5.141
6,211,976 B1 4/2001 Popovich et al.
(Continued)

FOREIGN PATENT DOCUMENTS

KR   10-2001-0074685 A   8/2001
KR   10-2013-0022900 A   3/2013
(Continued)

OTHER PUBLICATIONS

Wei Hu et al., "Improvement of diffraction efficiency of flat-panel coherent backlight for holographic displays", Optics Express, Feb. 23, 2015, vol. 23, No. 4, pp. 4726-4735 (10 pages total).
(Continued)

*Primary Examiner* — Jamie J Atala
*Assistant Examiner* — Michael Robert Cammarata
(74) *Attorney, Agent, or Firm* — Sughrue Mion, PLLC

(57) ABSTRACT

A backlight device having a light guide, a first holographic optical element and a second holographic element are provided. The light guide plate guides light emitted by a light source towards the first holographic optical element. The first holographic optical element, which has a multi-layered structure, is provided on a first side of the light guide plate and reflects the light according to the wavelength ranges based on the characteristics of the multi-layered structure. The second holographic optical element, which concentrates light reflected by the first holographic optical element onto at least two points is provided on a second side of the light guide plate perpendicular to the first side.

20 Claims, 16 Drawing Sheets

(51) Int. Cl.
*G02B 5/32* (2006.01)
*F21V 8/00* (2006.01)
*G03H 1/02* (2006.01)
*G03H 1/18* (2006.01)
*G06F 3/01* (2006.01)

(52) U.S. Cl.
CPC ......... *G02B 6/0026* (2013.01); *G02B 6/0031* (2013.01); *G03H 1/02* (2013.01); *G03H 1/0408* (2013.01); *G03H 1/0465* (2013.01); *G03H 1/181* (2013.01); *G03H 1/2286* (2013.01); *G06F 3/013* (2013.01); *G03H 1/2294* (2013.01); *G03H 2001/0216* (2013.01); *G03H 2001/0439* (2013.01); *G03H 2001/2226* (2013.01); *G03H 2001/2292* (2013.01); *G03H 2222/36* (2013.01); *G03H 2223/16* (2013.01); *G03H 2226/05* (2013.01); *G03H 2240/52* (2013.01); *G03H 2240/53* (2013.01)

(56) References Cited

U.S. PATENT DOCUMENTS

| | | | |
|---|---|---|---|
| 6,646,636 | B1 | 11/2003 | Popovich et al. |
| 6,799,849 | B2 * | 10/2004 | Kim .................. G02B 27/0905 348/E9.027 |
| 9,332,280 | B2 | 5/2016 | Han et al. |
| 2004/0141217 | A1 * | 7/2004 | Endo ....................... G02B 5/203 359/13 |
| 2007/0070504 | A1 * | 3/2007 | Akutsu ................ G02B 5/1861 359/573 |
| 2007/0188837 | A1 * | 8/2007 | Shimizu ................. G02B 5/203 359/13 |
| 2009/0303212 | A1 * | 12/2009 | Akutsu .................. G02B 5/203 345/204 |
| 2010/0157400 | A1 * | 6/2010 | Dimov .................... G02B 5/188 359/13 |
| 2013/0155477 | A1 * | 6/2013 | Yankov ................ G02B 27/225 359/15 |
| 2013/0170004 | A1 * | 7/2013 | Futterer ............... G02B 6/0046 359/9 |
| 2013/0265625 | A1 | 10/2013 | Facke et al. |
| 2013/0335795 | A1 * | 12/2013 | Song .................... G03H 1/2294 359/9 |
| 2014/0016051 | A1 * | 1/2014 | Kroll .................... H04N 13/305 349/15 |
| 2014/0160543 | A1 * | 6/2014 | Putilin ................. G03H 1/2202 359/9 |
| 2014/0285862 | A1 * | 9/2014 | Song ........................ G02B 5/32 359/16 |
| 2015/0009546 | A1 | 1/2015 | Wiltshire |
| 2015/0205034 | A1 * | 7/2015 | Facke .................. G02B 6/0035 362/606 |
| 2015/0378080 | A1 | 12/2015 | Georgiou et al. |
| 2016/0011565 | A1 | 1/2016 | Sung et al. |
| 2016/0033710 | A1 | 2/2016 | Kim et al. |
| 2016/0041323 | A1 * | 2/2016 | Ma ....................... G03H 1/0465 359/15 |
| 2016/0065955 | A1 * | 3/2016 | Kim .................... G03H 1/0005 348/54 |
| 2016/0147003 | A1 * | 5/2016 | Morozov ............. G02B 6/0023 359/11 |
| 2018/0094791 | A1 * | 4/2018 | Lee ........................... F21V 5/00 |
| 2019/0155337 | A1 * | 5/2019 | Ohkawa ................... G02B 5/32 |

FOREIGN PATENT DOCUMENTS

| | | |
|---|---|---|
| KR | 10-2014-0115687 A | 10/2014 |
| KR | 10-2016-0006033 A | 1/2016 |
| KR | 10-2016-0014511 A | 2/2016 |
| WO | WO-2013163347 A1 * 10/2013 ......... G02B 27/0081 |

OTHER PUBLICATIONS

Communication dated Dec. 4, 2017, issued by the European Patent Office in counterpart European Application No. 17193850.9.

* cited by examiner

BACKLIGHT DEVICE, HOLOGRAPHIC DISPLAY INCLUDING THE SAME, AND METHOD OF MANUFACTURING HOLOGRAPHIC OPTICAL ELEMENT HAVING A MULTILAYERED STRUCTURE

CROSS-REFERENCE TO RELATED APPLICATION

This application claims priority from Korean Patent Application No. 10-2016-0150336, filed on Nov. 11, 2016 in the Korean Intellectual Property Office, the disclosure of which is incorporated herein by reference in its entirety.

BACKGROUND

1. Field

Exemplary embodiments relate to a backlight device for displaying holographic three-dimensional (3D) images, a holographic display that includes the backlight device, and a method of manufacturing a holographic optical element.

2. Description of the Related Art

As many 3D films have recently been released, much research has been carried out on technology related to apparatuses for displaying 3D images. Well-known methods of forming 3D images include a stereoscopic technique, a volumetric technique, and a holographic technique.

The stereoscopic technique uses binocular parallax between two eyes and conveys depth perception to a user by providing a left-eye image and a right-eye image having viewpoints different from each other to the user's left eye and right eye, respectively. Examples of an apparatus for displaying a 3D image include a glasses-type apparatus that entails the use of special glasses and a non-glasses-type apparatus for which special glasses are not used.

However, when a 3D image is viewed by using a stereoscopic technique, since eye strain is caused, and since an apparatus for displaying a 3D image that provides only two viewpoints which respectively correspond to a left-eye image and a right-eye image does not reflect a change in viewpoint as a user moves, there is a limitation in conveying natural depth perception to the user.

Thus, holographic displays have been studied in order to display a more natural 3D image.

SUMMARY

One or more exemplary embodiments provide a backlight device for displaying holographic 3D images.

Further, one or more exemplary embodiments provide a holographic display for displaying holographic 3D images.

Further still, one or more exemplary embodiments provide a method of manufacturing a holographic optical element having a multi-layered structure.

According to an aspect of an exemplary embodiment, a backlight device includes: a light source configured to emit light; a light guide plate configured to guide the light emitted by the light source; a first holographic optical element provided on a side of the light guide plate, configured to expand light that has propagated through the light guide plate, and having layers that are separated according to a wavelength of the light; and a second holographic optical element configured to concentrate light reflected by the first holographic optical element.

The light source may include a laser or a light-emitting diode (LED).

The backlight device may further include at least one optical path converter configured to change a path of the light emitted by the light source.

The backlight device may further include an optical deflector configured to change a direction in which the light emitted by the light source is incident on the light guide plate.

The backlight device may further include an eye-tracking device configured to track positions of pupils of a user.

The layers of the first holographic optical element may include a first layer that responds to light of a first color and a second layer that responds to light of a second color and light of a third color.

The light of a first color may include blue light, the light of a second color may include green light, and the light of a third color may include red light.

The layers of first holographic optical element may include a first layer that responds to light of a first color, a second layer that responds to light of a second color, and a third layer that responds to light of a third color.

The light of a first color may include blue light, the light of a second color may include green light, and the light of a third color may include red light.

According to an aspect of another exemplary embodiment, a backlight device includes: a light source configured to emit light; a light guide plate configured to guide the light emitted by the light source; a holographic optical element provided on a surface of the light guide plate; and an optical element configured to cause light from the light source to expand and be incident on the holographic optical element, wherein the holographic optical element is configured to concentrate the light on at least two points.

The optical element may include a prism or a mirror.

According to an aspect of another exemplary embodiment, a holographic display includes: a light source configured to emit light; a light guide plate configured to guide light emitted by the light source; a first holographic optical element provided on a side of the light guide plate, configured to expand light that has propagated through the light guide plate, and including at least two stacked layers that each respond to a wavelength of the light; a second holographic optical element configured to concentrate light reflected by the first holographic optical element; and a display panel configured to display an image by using light that has propagated through the light guide plate from the second holographic optical element.

According to an aspect of another exemplary embodiment, a backlight device includes: a light source configured to emit light; a light guide plate configured to guide the light emitted by the light source; a holographic optical element provided on a surface of the light guide plate; an optical element configured to cause light from the light source to expand and be incident on the holographic optical element; and a display panel configured to display an image by using light that has propagated through the light guide plate from the holographic optical element, wherein the holographic optical element is configured to focus the light on at least two points.

According to an aspect of another exemplary embodiment, a method of manufacturing a holographic optical element includes: attaching a first layer to a substrate; dividing the first layer into a plurality of areas and sequentially recording holograms by using light of a first color; attaching a second layer to the first layer; and recording holograms on the second layer by using light of a second color and light of a third color.

The method may further include performing pre-exposure on the first layer by using a light source that has a low coherence.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
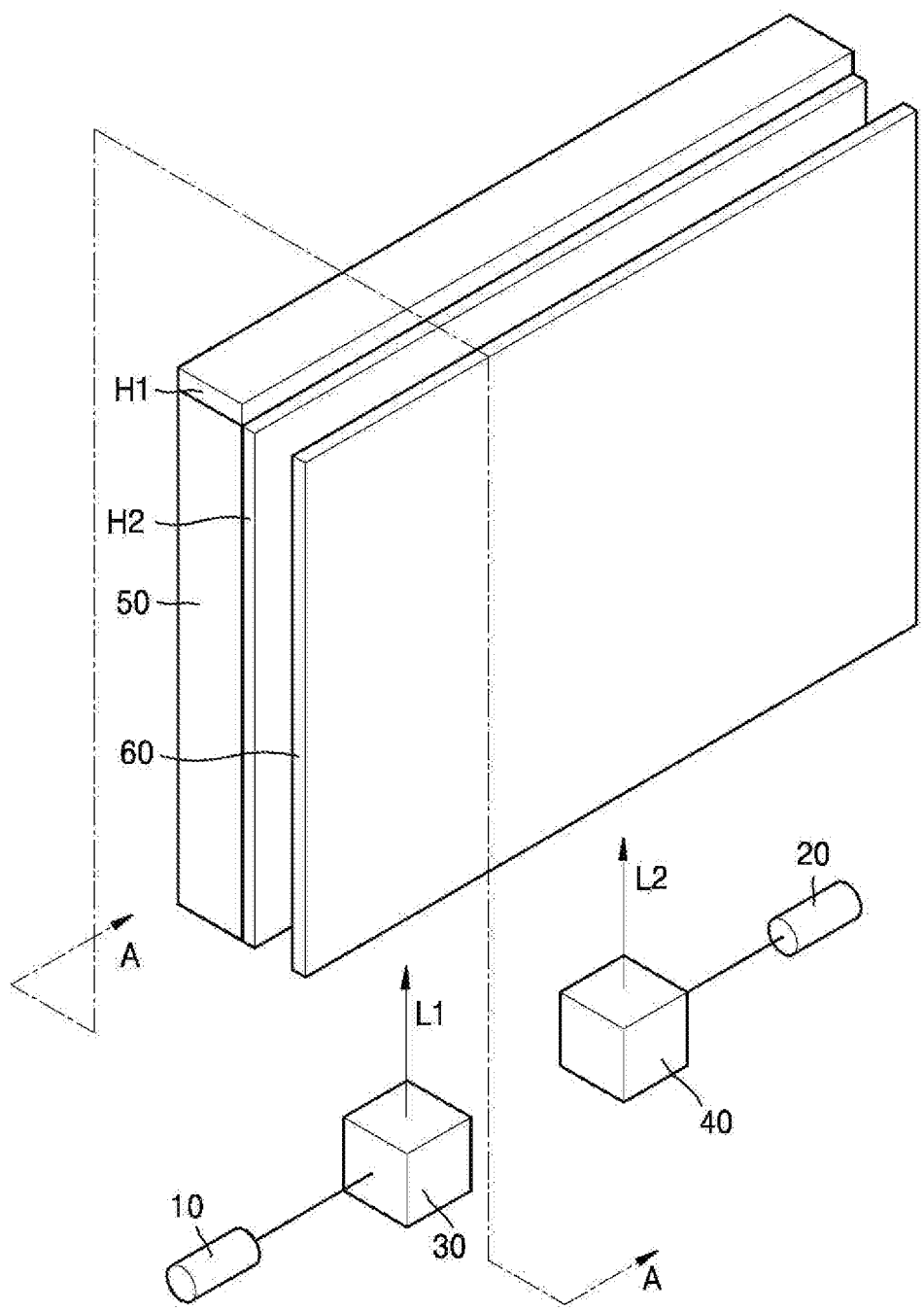
FIG. 1 is a perspective view of a holographic display, according to an exemplary embodiment.

Exemplary embodiments will now be described more fully with reference to the accompanying drawings. In the drawings, the same reference numerals denote the same elements and sizes or thicknesses of elements may be exaggerated for convenience of explanation. It will be apparent to one of ordinary skill in the art that various modifications and variations can be made with respect to the exemplary embodiments without departing from the spirit or scope of the present disclosure. It will be understood that when an element or layer is referred to as being "on", "connected to", or "coupled to" another element or layer, it can be directly on, connected or coupled to the other element or layer or intervening elements or layers may be present.

Expressions such as "at least one of," when preceding a list of elements, modify the entire list of elements and do not modify the individual elements of the list.

Figure 2:
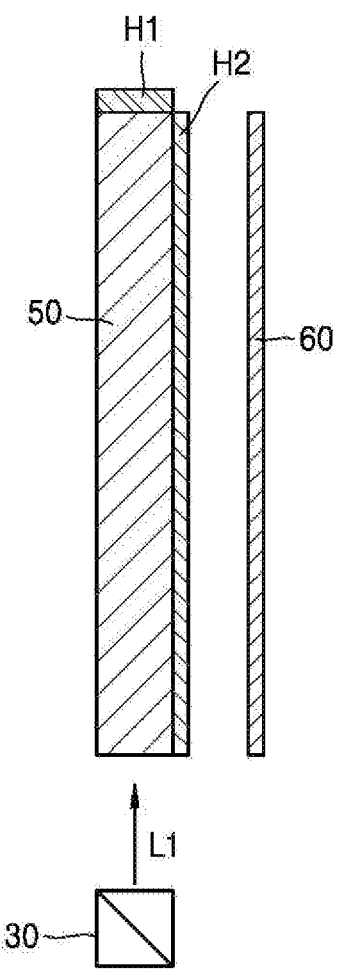
FIG. 2 is a cross-sectional view of the holographic display, according to an exemplary embodiment.

FIG. 1 is a perspective view of a holographic display, according to an exemplary embodiment. FIG. 2 is a cross-sectional view taken along line A-A of FIG. 1.

The holographic display may include a display panel 60 on which an image is displayed and a backlight device (also referred to herein as a "backlight unit") that supplies light to the display panel 60. The backlight device may include a light source that emits light, a light guide plate 50 that guides the light emitted by the light source, a first holographic optical element H1, and a second holographic optical element H2.

Figure 3:
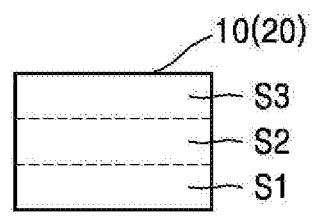
FIG. 3 is a view of a light source of the holographic display, according to an exemplary embodiment.

Examples of the light source may include a laser diode, a solid-state laser, a light-emitting diode (LED), and an optical fiber. The light source may include a first light source 10 and a second light source 20. The first light source 10 is a light source that is configured for providing an image for a first eye (e.g., the left eye) and the second light source 20 is a light source that is configured for providing an image for a second eye (e.g., the right eye). Each of the first light source 10 and the second light source 20 may include a plurality of color light sources. Referring to FIG. 3, each of the first light source 10 and the second light source 20 may include, for example, a first color light source S1 that emits light of a first wavelength, a second color light source S2 that emits light of a second wavelength, and a third color light source S3 that emits light of a third wavelength. For example, the first color light source S1 may emit blue light, the second color light source S2 may emit green light, and the third color light source S3 may emit red light.

An optical path converter for changing a path of light according to positions of the first light source 10 and the second light source 20 may further be provided.

When light from the first light source 10 and the second light source 20 is emitted in a direction parallel to a surface of the first holographic optical element H1, a first optical path converter 30 which is configured to change a propagation direction of light may be provided so that first light L1 emitted by the first light source 10 propagates toward the first holographic optical element H1. Also, a second optical path converter 40 which is configured for changing a propagation direction of light may be provided so that second light L2 emitted by the second light source 20 propagates toward the first holographic optical element H1. A position of a light source may be appropriately selected to reduce an overall space or size of the holographic display.

The light guide plate 50 may guide the first light L1 and the second light L2 so that the first light L1 and the second light L2 are incident on the first holographic optical element H1. The first light L1 and the second light L2 may be guided through the light guide plate 50, without total reflection, to the first holographic optical element H1. The light guide plate 50 may have a rectangular cross-sectional shape or a square cross-sectional shape. However, a cross-sectional shape of the light guide plate 50 is not limited thereto. Also, the light guide plate 50 may be formed such that a cross-sectional area thereof is constant in a longitudinal direction of the light guide plate 50. The light guide plate 50 may be formed of transparent plastic, optical glass, or quartz glass. However, a cross-sectional shape and a material of the light guide plate 50 are not limited thereto, and may be any of various other shapes and materials.

Figure 4:
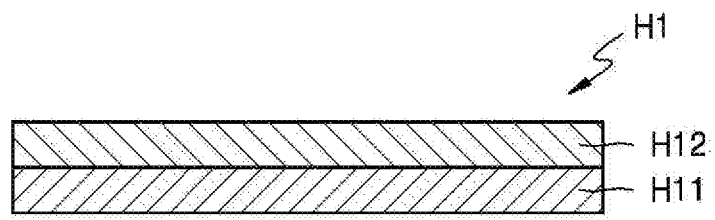
FIG. 4 is a view of a first holographic optical element of the holographic display, according to an exemplary embodiment.

The first holographic optical element H1 may have a multi-layered structure which includes respective layers that are separated according to a wavelength of light. FIG. 4 illustrates a multi-layered structure of the first holographic optical element H1, according to an exemplary embodiment. For example, the first holographic optical element H1 may include a first layer H11 and a second layer L12. The first layer H11 may include a hologram pattern that varies based on light of a first wavelength, and the second light H12 may include a hologram pattern that varies based on light of a second wavelength and light of a third wavelength. Alternatively, the two layers of FIG. 4 may be repeatedly stacked two or more times.

Figure 5:
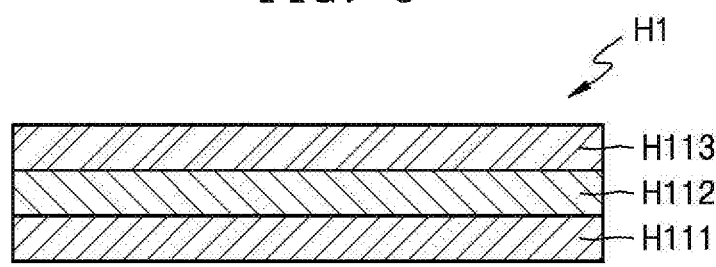
FIG. 5 is a view of the first holographic optical element of the holographic display, according to another exemplary embodiment.

Alternatively, as shown in FIG. 5, the first holographic optical element H1 may include a first layer H111, a second layer H112, and a third layer H113. For example, the first layer H111 may include a hologram pattern that varies based on light of a first wavelength, the second layer H112 may include a hologram pattern that varies based on light of a second wavelength, and the third layer H113 may include a hologram pattern that varies based on light of a third wavelength.

Figure 6:
FIGS. 6, 7, and 8 are views illustrating a multi-layered structure of the first holographic optical element of the holographic display, according to exemplary embodiments.

For example, as shown in FIG. 6, the first holographic optical element H1 may include a first layer B that varies based on light of a blue wavelength, and may include a second layer GR that varies based on light of a green wavelength and light of a red wavelength.

Figure 7:
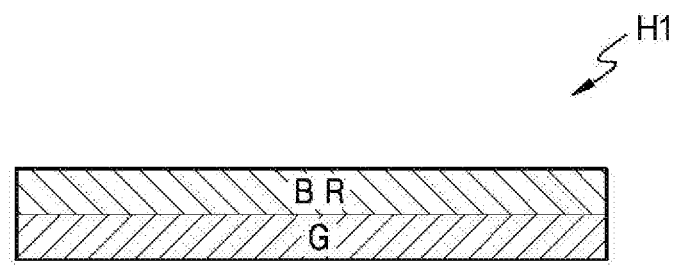

For example, as shown in FIG. 7, the first holographic optical element H1 may include a first layer G that varies based on light of a red wavelength, and may include a second layer BR that varies based on light of a blue wavelength and light of a red wavelength.

Figure 8:
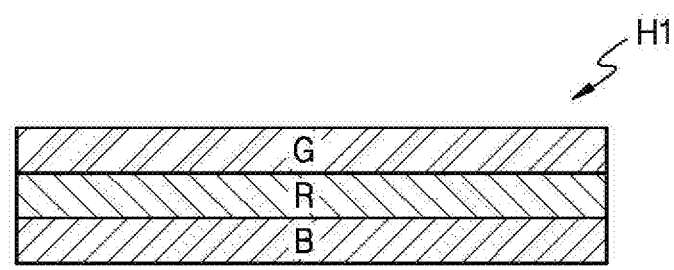

FIG. 8 is a view illustrating an example in which the first holographic optical element H1 includes three layers. The first holographic optical element H1 may include a first layer B that varies based on blue light, a second layer R that varies based on red light, and a third layer G that varies based on green light.

As such, since the first holographic optical element H1 has a multi-layered structure, light efficiency may increase. When hologram patterns that respond to a plurality of wavelengths are included in one layer, light efficiency for each of the wavelengths may be reduced. However, when a multi-layered structure is used, light efficiency of each layer for a corresponding wavelength may be increased. For example, light of a blue wavelength has light efficiency lower than that of light of another wavelength. Accordingly, a layer that varies based on light of a blue wavelength may be separately provided so that light efficiency for light of a blue wavelength is higher than that of light of another wavelength. Also, when a layer that varies based on light of a blue wavelength from among light incident through the light guide plate 50 is first positioned, light efficiency for light of a blue wavelength which is relatively low may increase. However, an order of layers is not limited thereto.

Table 1 shows light efficiency for each color of light when holographic optical elements having a single-layered structure, a double-layered structure, and a triple-layered structure are used. In the holographic optical element having the single-layered structure, holograms are simultaneously recorded by using red light, green light, and blue light. The holographic optical element having the double-layered structure may include a first layer on which a hologram is recorded by using blue light, and a second layer on which holograms are simultaneously recorded by using red light and green light. The holographic optical element having the triple-layered structure may include a first layer on which a hologram is recorded by using blue light, a second layer on which a hologram is recorded by using green light, and a third layer on which a hologram is recorded by using red light.

TABLE 1

|  | Single-layered structure | Double-layered structure | Triple-layered structure |
| --- | --- | --- | --- |
| Red light efficiency | 15.16% | 27.42% | 62.63% |
| Green light efficiency | 28.14% | 41.75% | 61.17% |
| Blue light efficiency | 23.41% | 60.74% | 54.64% |

In Table 1, light efficiency increases in an order of the single-layered structure, the double-layered structure, and the triple-layered structure for each color of light.

Table 2 shows final light efficiency of a holographic optical element having a triple-layered structure in which holograms are recorded by using blue light, green light, and red light.

TABLE 2

| | Final light efficiency | | | |
| --- | --- | --- | --- | --- |
| | Sample 1 | Sample 2 | Sample 3 | Sample 4 |
| Red light efficiency | 8.48% | 11.05% | 8.90% | 8.29% |
| Green light efficiency | 5.60% | 6.89% | 7.56% | 8.61% |
| Blue light efficiency | 2.63% | 2.22% | 2.09% | 2.80% |

The first holographic optical element H1 may be provided on a side surface of the light guide plate 50. When a user observes a 3D screen, a surface that is perpendicular to a display panel surface on which an image is formed may be the side surface of the light guide plate 50. A surface of the light guide plate 50 that is parallel to the display panel surface and is relatively close to the user may be a front surface, and a surface of the light guide plate 50 that is parallel to the display panel surface and is relatively far from the user may be a rear surface.

The second holographic optical element H2 may be provided on the front surface or the rear surface of the light guide plate 50. In FIGS. 1 and 2, the first holographic optical element H2 is provided on the front surface of the light guide plate 50. The first holographic optical element H1 may expand light that is incident thereon from the first light source 30 and the second light source 40. For example, the first holographic optical element H1 may be configured to parallelize incident light emitted by the first light source 30 and the second light source 40. The first holographic optical element H1 may expand light so that the light is incident on an entire surface of the second holographic optical element H2.

The first holographic optical element H1 may expand light and may reflect the light toward the second holographic optical element H2.

The second holographic optical element H2 may enable light incident from the first holographic optical element H1 to propagate toward the display panel 60. The second holographic optical element H2 may be a transmissive element or a reflective element. When the second holographic optical element H2 is provided on the front surface of the light guide plate 50 as shown in FIG. 2, the second holographic optical element H2 may be a transmissive element. When the second holographic optical element H2 is provided on the rear surface of the light guide plate 50, the second holographic optical element 50 may be a reflective element. The second holographic optical element H2 may be configured to concentrate incident light on at least two viewing zones. For example, the second holographic optical element H2 may focus the first light L1 from the first light source 10 on a first viewing zone and may focus the second light L2 from the second light source 20 on a second viewing zone.

The first holographic optical element H1 and the second holographic optical element H2 may include diffraction gratings. Inclination angles and an interval between lattice of the diffraction gratings may be appropriately adjusted so that the first holographic optical element H1 parallelizes incident light emitted by the first light source 10 and the second light source 20 and directs the light toward the second holographic optical element H2 located on the front surface of the light guide plate 50. Also, the inclination angles and the interval between the lattice of the diffraction gratings may be appropriately adjusted so that the second holographic optical element H2 transmits (or reflects) and concentrates the light whose direction is changed by the first holographic optical element H1.

Alternatively, the first holographic optical element H1 and the second holographic optical element H2 may include hologram patterns recorded by using a reference beam and a signal beam, which will be explained below.

The second holographic optical element H2 may form, for example, a right-eye viewing zone and a left-eye viewing zone. Each viewing zone may be formed from the first and second light sources 10 and 20, the light guide plate 50, the first holographic optical element H1, and the second holographic optical element H2. An angle between two viewing zones may be determined by an angle between two rays of incident light emitted by the first light source 10 and the second light source 20. In general, an interval between two eyes of a user may be about 62 mm. Accordingly, the first light source 10 and the second light source 20 may be located so that an angle between two viewing zones is formed based on this interval.

Figure 9:
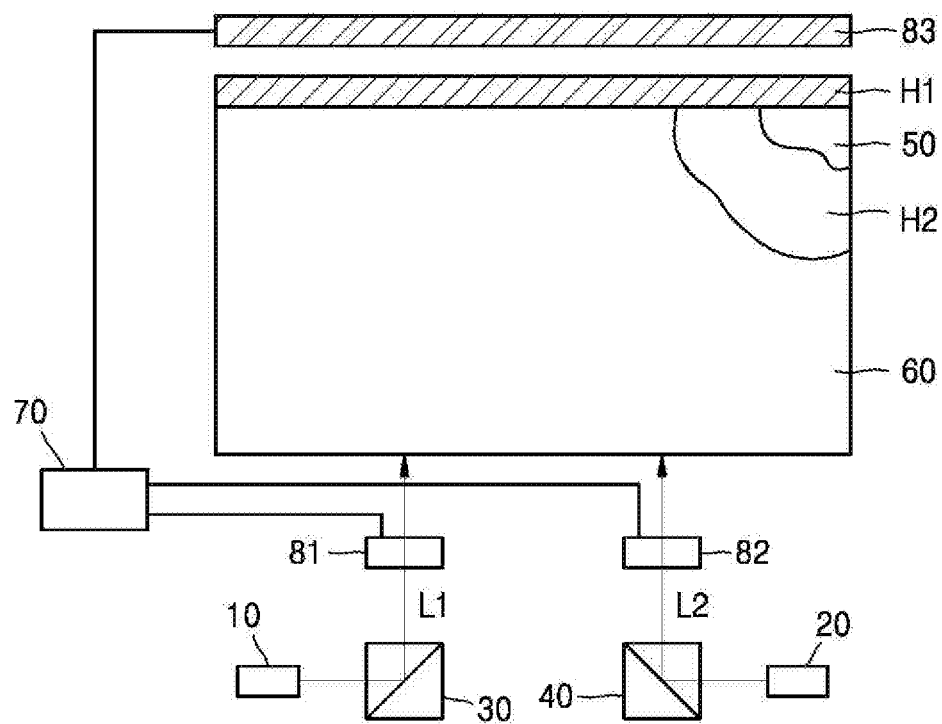
FIG. 9 is a view of a holographic display, according to another exemplary embodiment.

FIG. 9 is a view of a holographic display, according to another exemplary embodiment.

In FIG. 9, elements that are substantially the same as those of the holographic display of FIG. 1 are denoted by the same reference numerals, and a detailed explanation thereof will not be repeated. Referring to FIG. 9, a first optical deflector 81 may be further provided between the first optical path converter 30 and the light guide plate 50, and a second optical deflector 82 may be further provided between the second optical path converter 40 and the light guide plate 50. An eye-tracking device 83 which is configured for tracking the pupils of the user may be further provided. The eye-tracking device 83 may sense positions of the pupils of the user and may detect a change in the positions of the pupils of the user. When the eye-tracking device 83 detects a change in the positions of the pupils of the user, positions of viewing zones may be changed by deflecting the first light L1 from the first light source 10 and deflecting the second light L2 from the second light source 20.

Examples of the eye-tracking device 83 may include an infrared camera, a visible light camera, and various other sensors. The eye-tracking device 83 may obtain an image of the user by using, for example, a camera, may detect the pupils of the user in the image, and may analyze positions of the pupils. Also, when the eyes of the user may not be sensed due to eye blinking or obstacles, positions of the eyes may be predicted and movements of the eyes according to the movement of the user may be predicted. The eye-tracking device 83 may track a change in positions of the pupils of the user in real time and may provide a result of the tracking to a controller 70. When it is determined according to information sensed by the eye-tracking device 83 that the positions of the pupils of the user are changed, the controller 70 may control a direction in which light is output by moving the first and second optical deflectors 81 and 82 so that viewing zones of an image are adjusted based on the changed positions of the pupils of the user. Each of the first and second optical deflectors 81 and 82 may include, for example, a liquid crystal layer.

Figure 10:
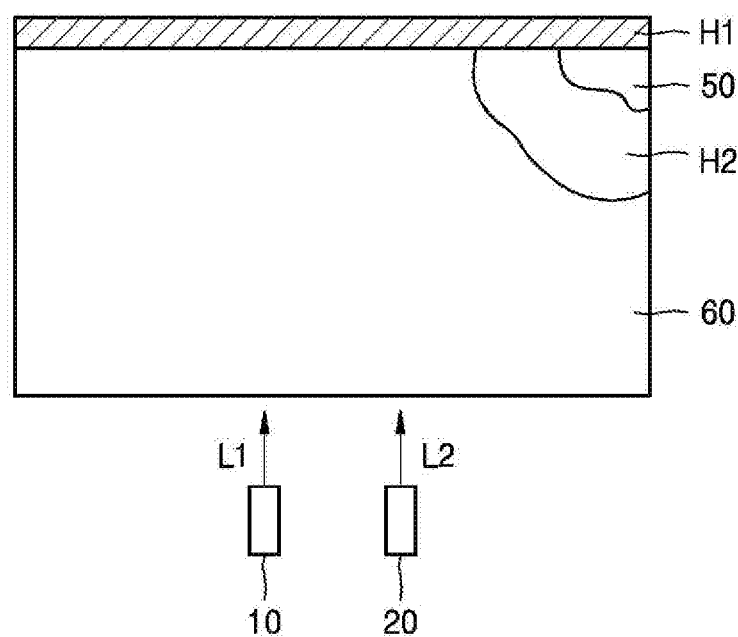
FIG. 10 is a view of a holographic display, according to another exemplary embodiment.

FIG. 10 is a view illustrating an example in which the first light source 10 and the second light source 20 are arranged to directly emit light toward the light guide plate 50, according to an exemplary embodiment. In this case, since an optical path converter is not separately provided between the first light source 10 and the light guide plate 50 and between the second light source 20 and the light guide plate 50, the number of parts may be reduced. The first light source 10 and the second light source 20 may be appropriately arranged to efficiently use space of a holographic display.

Figure 11:
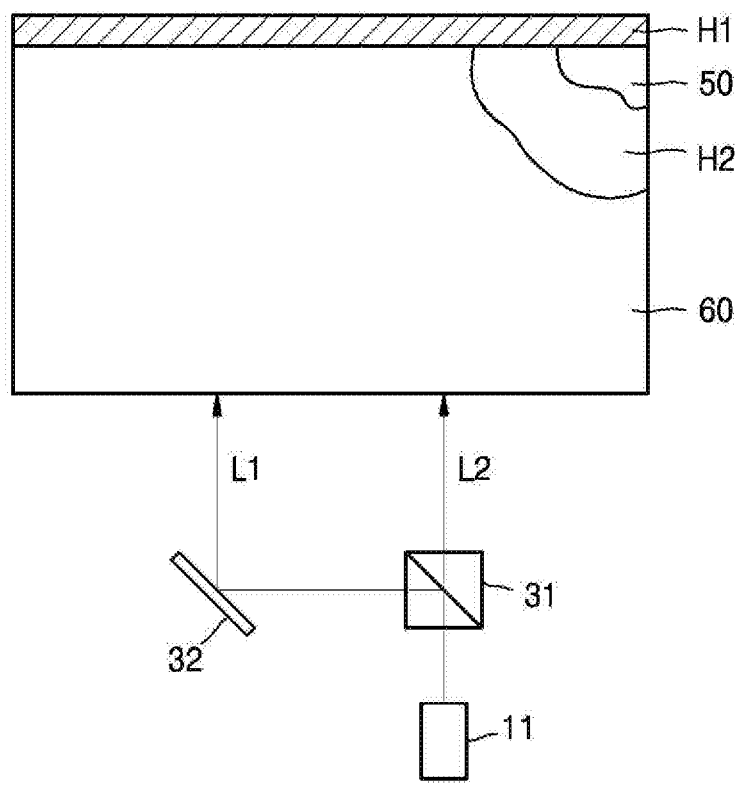
FIG. 11 is a view of a holographic display, according to another exemplary embodiment.

FIG. 11 is a view illustrating an example in which one light source is used. A holographic display of FIG. 11 may include a light source 11, a beam splitter 31 that splits light received from the light source 11 according to a predetermined ratio, and an optical path converter 32. The beam splitter 31 may transmit a part of the light from the light source 11 and may reflect another part of the light. The first light L1 reflected by the beam splitter 31 is reflected by the optical path converter 32 toward the light guide plate 50, and light transmitted through the beam splitter 31 travels toward the light guide plate 50. The first light L1 and the second light L2 may be propagate through the light guide plate 50 and be incident on the first holographic optical element H1, may be expanded by the first holographic optical element H1, and may be incident on an entire surface of the second holographic optical element H2. The second holographic optical element H2 may concentrate the first light L1 and the second light L2, which is incident thereon from different directions, on different points.

Although the light source 11 is positioned to emit light upward in FIG. 11, exemplary embodiments are not limited thereto, and the light source 11 may be positioned to emit light in a direction parallel to the light guide plate 50.

Figure 12:
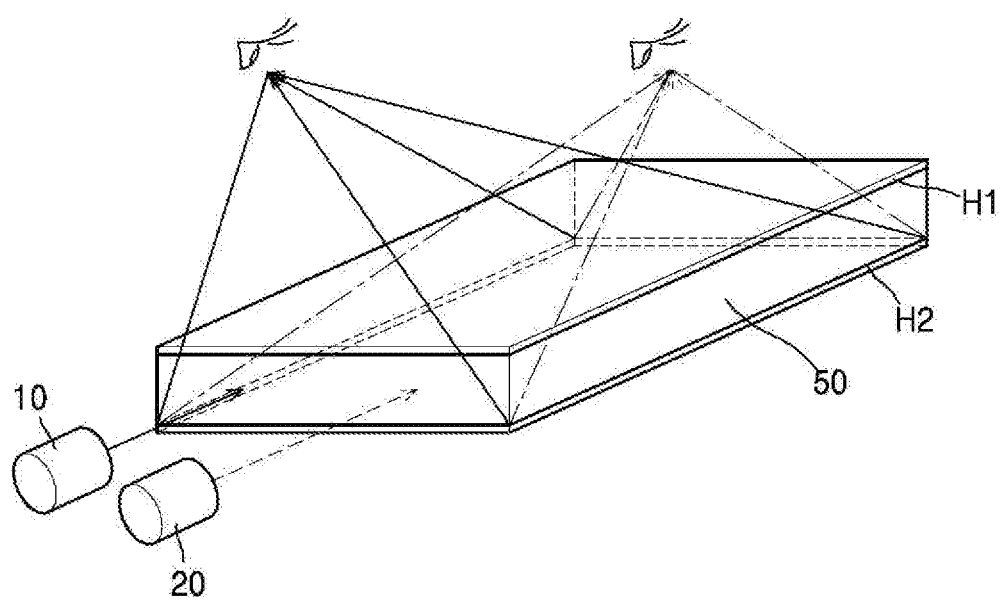
FIG. 12 is a view of a holographic display, according to another exemplary embodiment.

FIG. 12 is a view illustrating an example in which the first and second light sources 10 and 20 are disposed relatively close to a short side of the light guide plate 50. The first holographic optical element H1 may be provided on a side surface of the light guide plate 50 which faces the first and second light sources. The second holographic optical element H2 may be provided on a rear surface of the light guide plate 50. The second holographic optical element H2 may operate as an objective lens so that at least two viewing zones on which light that is incident thereon from the first holographic optical element H1 is concentrated are formed at a predetermined distance from the light guide plate 50. A holographic display according to an exemplary embodiment may be applied to, for example, a mobile phone, and a light source may be located relatively close to a short side of the mobile phone, as shown in FIG. 12.

Figure 13:
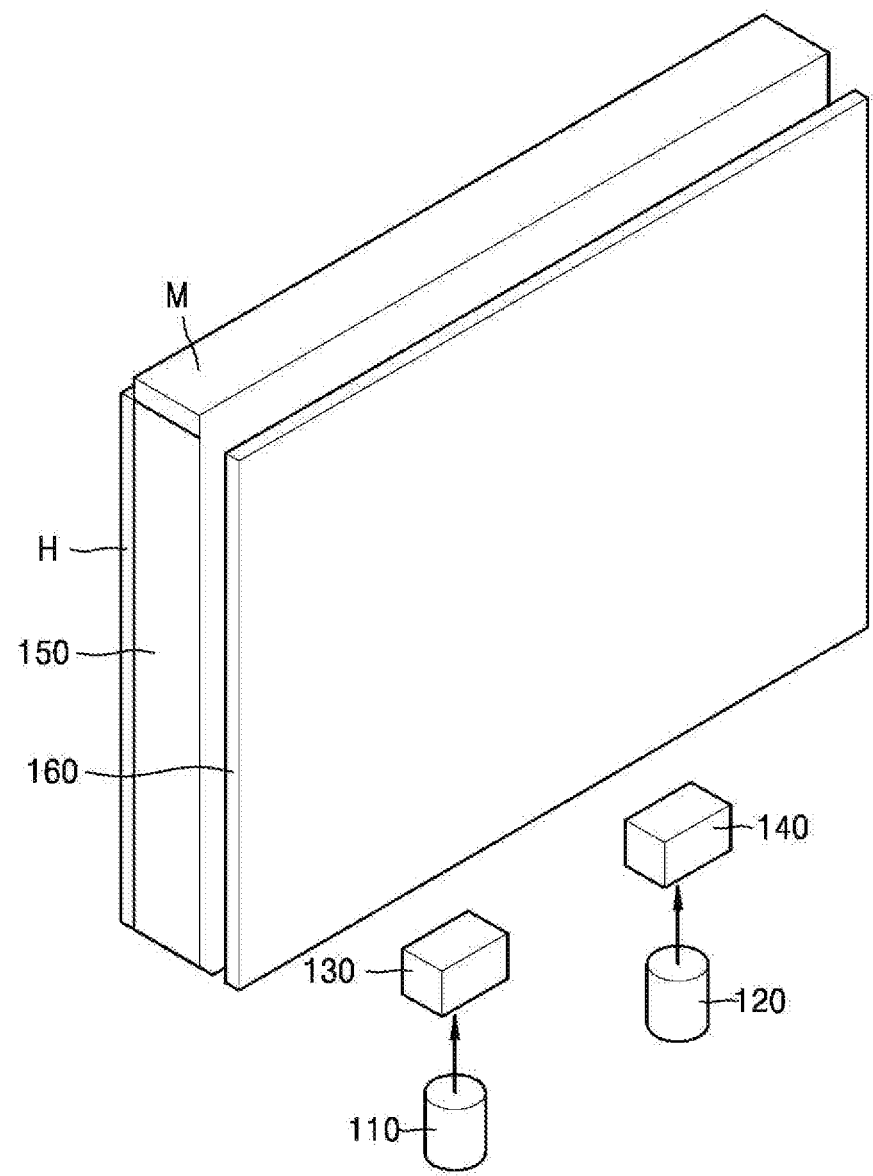
FIG. 13 is a view of a holographic display, according to another exemplary embodiment.

FIG. 13 is a perspective view of a holographic display, according to another exemplary embodiment.

The holographic display of FIG. 13 may include a first light source 110, a second light source 120, optical elements 130 and 140 that parallelize light from the first light source 110 and the second light source 120, a light guide plate 150, a reflector M, a holographic optical element H, and a display panel 160.

A controller 170 (referring also to FIG. 14) which is configured for controlling the first light source 110 and the second light source 120 to be turned on or off may be provided.

The first light source 110 and the second light source 120 may be located adjacent to each other, and examples of each of the first light source 110 and the second light source 120 may include a laser diode, a solid-state laser, an LED, and an optical fiber. The first light source 110 is a light source that is configured for forming a viewing zone for a first eye (e.g., the left eye), and the second light source 120 is a light source that is configured for forming a viewing zone for a second eye (e.g., the right eye). Each of the first light source 110 and the second light source 120 may include a plurality of color light sources.

The optical elements 130 and 140 may cause the first light L1 emitted by the first light source 110 and the second light L2 emitted by the second light source 120 to be parallel and to be incident on the light guide plate 150. Examples of each of the optical elements 130 and 140 may include any of a concave lens, a convex lens, a holographic element, and a combination thereof. Although the optical elements 130 and 140 are separately provided as different structural components in FIG. 13, the optical elements 130 and 140 may be provided as one integral component.

The first light L1 and the second light L2 may propagate through the light guide plate 150 and be incident on the reflector M. The light guide plate 150 may facilitate propagation of the first light L1 and the second light L2 without total reflection. The reflector M may be positioned to reflect the first light L1 and the second light L2 toward the holographic optical element H. The reflector M may include an inclined reflective surface in order to control an angle at which light is reflected. The first light L1 and the second light L2 may be expanded and reflected by the optical element 130 and the reflector M and may be incident on the holographic optical element H. The holographic optical element H may concentrate the first light L1 on one viewing zone and may concentrate the second light L2 on another viewing zone.

An image may be formed on the display panel 160 by using the first light L1 and the second light L2 incident from the holographic optical element H.

In the present exemplary embodiment, light may be expanded and concentrated by using a combination of a general optical element and a holographic optical element.

Figure 14:
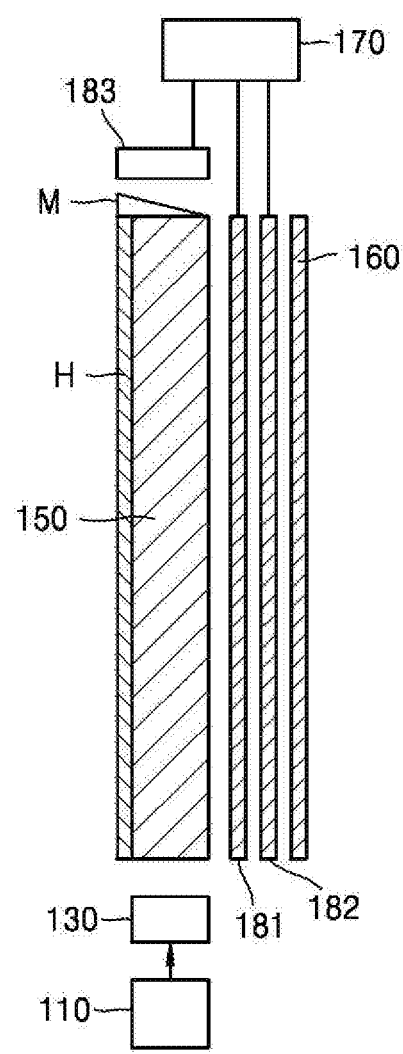
FIG. 14 is a view of a holographic display, according to another exemplary embodiment.

FIG. 14 is a view illustrating an example in which the holographic display of FIG. 13 further includes an eye-tracking device 183. The eye-tracking device 183 may be configured to track positions of the eyes of the user. The eye-tracking device 183 may sense positions of the pupils of the user and detect a change in the positions of the pupils of the user. Examples of the eye-tracking device 183 may include an infrared camera, a visible light camera, and various other sensors.

An optical deflector which is configured for deflecting light may be provided between the light guide plate 150 and the display panel 160. For example, the optical deflector may include a first optical deflector 181 that deflects light in a vertical direction and a second optical deflector 182 that deflects light in a horizontal direction. Examples of each of the first and second optical deflectors 181 and 182 may include a liquid crystal layer and an electrowetting device. When the eye-tracking device 183 detects a change in the positions of the pupils of the user, the first optical deflector 181 and the second optical deflector 182 may deflect the first light L1 from the first light source 110 and the second light L2 from the second light source 120 so that positions of viewing zones correspond to the positions of the pupils of the user.

The holographic display according to an exemplary embodiment may be applied to, for example, a mobile phone. When the user sees a screen of the mobile phone, positions of the eyes of the user may be tracked and a 3D image may be displayed according to the positions of the eyes by using the eye-tracking device 183 and the first and second optical deflectors 181 and 182.

Figure 15:
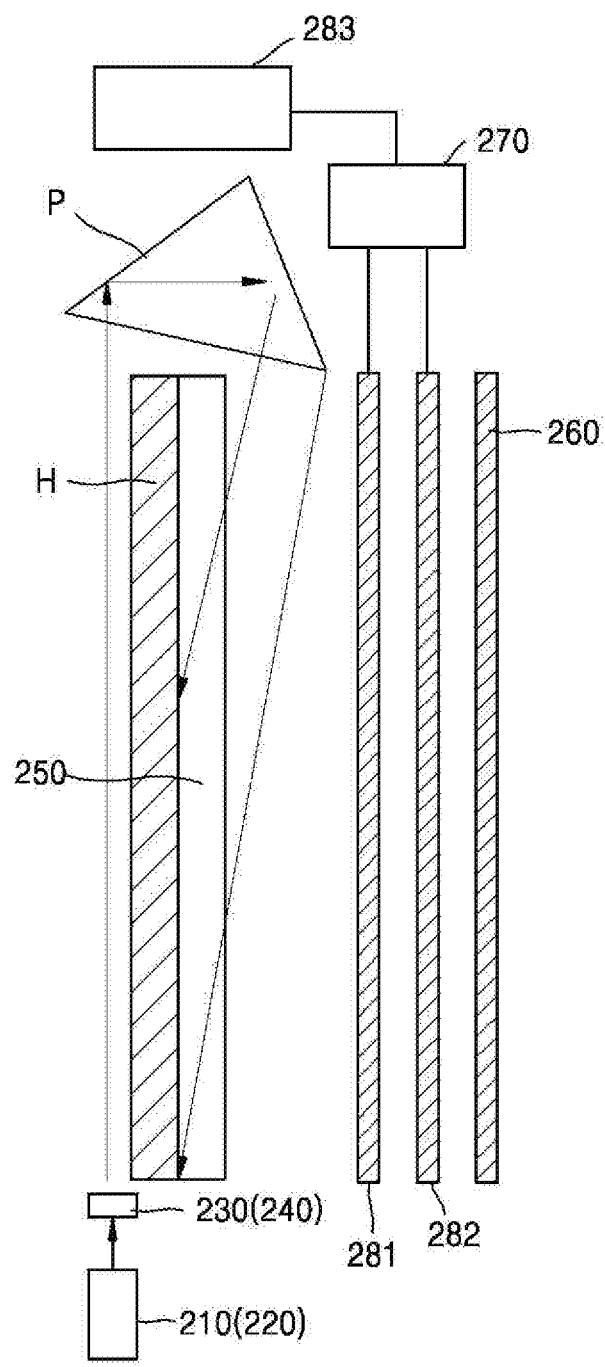
FIG. 15 is a view of a holographic display, according to another exemplary embodiment.

FIG. 15 is a view of a holographic display, according to another exemplary embodiment. The holographic display may include a first light source 210, a second light source 220, optical elements 230 and 240 that parallelize light from the first light source 210 and the second light source 220, a light guide plate 250, a prism P, the holographic optical element H, and a display panel 260.

The first light source 210 and the second light source 220 may be located adjacent to each other, and examples of each of the first light source 210 and the second light source 220 may include a laser diode, a solid-state laser, an LED, and an optical fiber. The first light source 210 is a light source which is configured for forming a viewing zone for a first eye (e.g., the left eye) and the second light source 220 is a light source which is configured for forming a viewing zone for a second eye (e.g., the right eye). Each of the first light source 210 and the second light source 220 may include a plurality of color light sources.

The optical elements 230 and 240 may cause the first light L1 from the first light source 210 and the second light L2 from the second light source 220 to be parallel and to be incident on the light guide plate 250. Examples of each of the optical elements 230 and 240 may include any of a concave lens, a convex lens, a holographic element, and a combination thereof. Although the optical elements 230 and 240 are separately provided as different components in FIG. 15, the optical elements 230 and 240 may be provided as one integral component.

The first light L1 and the second light L2 may be directly incident on the prism P without passing through the light guide plate 250. In this case, a thickness of the light guide plate 250 may be relatively small. The prism P may be positioned such that it reflects the first light L1 and the second light L2 toward the holographic optical element H. The prism P may control an angle at which light is refracted/reflected. The first light L1 and the second light L2 may be expanded and reflected by the optical element 230 and the prism P, and may propagate through the light guide plate 250 and be incident on the holographic optical element H. The holographic optical element H may concentrate the first light L1 on one viewing zone and may concentrate the second light L2 on another viewing zone.

An image may be formed on the display panel 260 by using the first light L1 and the second light L2 incident from the holographic optical element H.

In the present exemplary embodiment, light may be expanded and concentrated by using a combination of an optical element such as a mirror and a holographic optical element.

The holographic display may further include an eye-tracking device 283. The eye-tracking device 283 may be configured to track positions of the eyes of the user. The eye-tracking device 283 may sense positions of the pupils of the user and may detect a change in the positions of the pupils of the user. Examples of the eye-tracking device 283 may include an infrared camera, a visible light camera, and various other sensors.

An optical deflector for deflecting light may be provided between the light guide plate 250 and the display panel 260. For example, the optical deflector may include a first optical deflector 281 that deflects light in a vertical direction and a second optical deflector 282 that deflects light in a horizontal direction. Examples of each of the first and second deflectors 281 and 282 may include a liquid crystal layer and an electrowetting device. When the eye-tracking device 283 detects a change in the positions of the pupils of the user, the first optical deflector 281 and the second optical deflector 282 may deflect the first light L1 from the first light source 210 and the second light L2 from the second light source 220 so that positions of viewing zones correspond to the positions of the pupils of the user. Accordingly, even when the user moves, an image may be clearly displayed.

The holographic display according to an exemplary embodiment may be applied to, for example, a mobile phone. When the user sees a screen of the mobile phone, positions of the eyes of the user may be tracked and a 3D image may be displayed according to the positions of the eyes by using the eye-tracking device 283 and the first and second optical deflectors 281 and 282. When it is determined according to information sensed by the eye-tracking device 283 that positions of the pupils of the user have changed, the controller 270 may control the first optical deflector 281 and the second optical deflector 282 so that positions on an image are adjusted to the changed positions of the pupils of the user.

Figure 16:
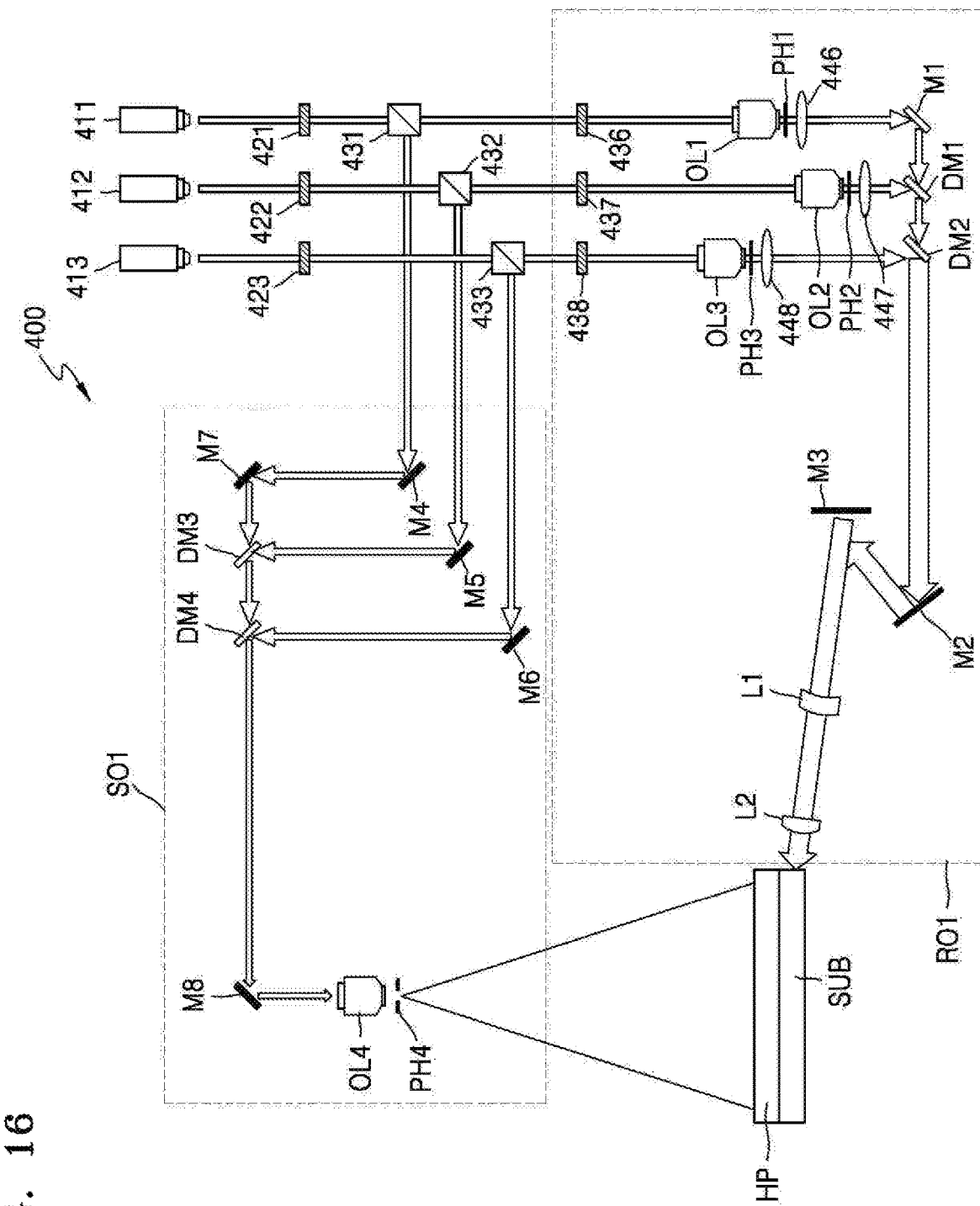
FIG. 16 is a view of a hologram recording apparatus for recording a hologram on a holographic optical element, according to an exemplary embodiment.

FIG. 16 is a view of a hologram recording apparatus 400 for recording a hologram pattern on a holographic optical element to concentrate light on two viewing zones, according to an exemplary embodiment.

The hologram recording apparatus 400 may be used to form the second holographic optical element H2 of FIG. 1 or the holographic optical element H of FIGS. 13 and 15. Referring to FIG. 16, the hologram recording apparatus 400 may include a first color light source 411, a second color light source 412, a third color light source 413, a first polarized beam splitter 431 that splits first light emitted by the first color light source 411 in a polarization direction, a second polarized beam splitter 432 that splits second light emitted by the second light source 412 in a polarization direction, and a third polarized beam splitter 433 that splits third light emitted by the third color light source 413 in a polarization direction. Each of the first polarized beam splitter 431, the second polarized beam splitter 432, and the third polarized beam splitter 433 may transmit first polarized light (e.g., P-polarized light) and may reflect second polarized light (e.g., S-polarized light).

Light split by each of the first polarized beam splitter 431, the second polarized beam splitter 432, and the third polarized beam splitter 433 may be used as signal light and reference light. For example, light reflected by each of the first polarized beam splitter 431, the second polarized beam splitter 432, and the third polarized beam splitter 433 may be used as signal light, and light that has propagated through each of the first polarized beam splitter 431, the second polarized beam splitter 432, and the third polarized beam splitter 433 may be used as reference light.

A first wave plate 421 may be further disposed between the first color light source 411 and the first polarized beam splitter 431, a second wave plate 422 may be further disposed between the second color light source 412 and the second polarized beam splitter 432, and a third wave plate 423 may be further disposed between the third color light source 413 and the third polarized beam splitter 433. Each of the first wave plate 421, the second wave plate 422, and the third wave plate 423 may be, for example, a quarter-wave plate and may change a phase of light.

First color reference light that has propagated through the first polarized beam splitter 431, second color reference light that has propagated through the second polarized beam splitter 432, and third color reference light that has propagated through the third polarized beam splitter 433 may become parallel due to the use of a parallel light forming unit.

The parallel light forming unit may include, for example, any of an objective lens, a pinhole, and a lens. For example, the first color reference light that has propagated through the first polarized beam splitter 431 may become parallel due to a first objective lens OL1, a first pinhole PH1, and a first lens 446. The second color reference light that has propagated through the second polarized beam splitter 432 may become parallel due to a second objective lens OL2, a second pinhole PH2, and a second lens 447. The third color reference light that has propagated through the third polarized beam splitter 433 may become parallel due to a third objective lens OL3, a third pinhole PH3, and a third lens 448. A fourth wave plate 436 may be further disposed between the first polarized beam splitter 431 and the first objective lens OL1, a fifth wave plate 437 may be further disposed between the second polarized beam splitter 432 and the second objective lens OL2, and a sixth wave plate 438 may be further disposed between the third polarized beam splitter 433 and the third objective lens OL3.

A first mirror M1, a first dichroic mirror DM1, and a second dichroic mirror DM2 may be provided to combine paths of the first color reference light, the second color reference light, and the third color reference light that are parallel to one another into one optical path. The first mirror M1, the first dichroic mirror DM1, and the second dichroic mirror DM2 may be aligned. The first dichroic mirror DM1 and the second dichroic mirror DM2 may reflect predetermined color light and may transmit other color light. For example, the first dichroic mirror DM1 may reflect second color light and may transmit first color light and third color light. The second dichroic mirror DM2 may reflect the third color light and may transmit the first color light and the second color light.

The first color reference light may be reflected by the first mirror M1 and then may be transmitted through the first dichroic mirror DM1 and the second dichroic mirror DM2. The second color reference light may be reflected by the first dichroic mirror DM1 and then may be transmitted through the second dichroic mirror DM2. The third color reference light may be reflected by the second dichroic mirror DM2.

Paths of the first color reference light, the second color reference light, and the third color reference light may be combined into one optical path via the above-described mechanism. Combined light may have a cross-sectional area that expands in one direction. At least one lens for expanding the light in another direction may be provided. The at least one lens may include, for example, a concave cylindrical lens L1 and a convex cylindrical lens L2. At least one optical path converter may be further disposed between the second dichroic mirror DM2 and the concave cylindrical lens L1. For example, the at least one optical path converter may include a second mirror M2 and a third mirror M3. The at least one optical path converter may change a path of light so that components may be appropriately arranged.

A system using first, second, and third reference light that has respectively propagated through the first polarized beam splitter 431, the second polarized beam splitter 432, and the third polarized beam splitter 433 may constitute a reference light system R01.

A system using first, second, and third signal light respectively reflected by the first polarized beam splitter 431, the second polarized beam splitter 432, and the third polarized beam splitter 433 may constitute a signal light system S01.

A seventh mirror M7, a third dichroic mirror DM3, and a fourth dichroic mirror DM4 may be aligned so as to combine paths of first color signal light reflected by the first polarized beam splitter 431, second color signal light reflected by the second polarized beam splitter 432, and third color signal light reflected by the third polarized beam splitter 433 into one optical path.

The third dichroic mirror DM3 may reflect second color light and may transmit first color light and third color light. The fourth dichroic mirror DM4 may reflect the third color light and may transmit the first color light and the second color light.

The first color signal light may be reflected by the seventh mirror M7 and then may be transmitted through the third dichroic mirror DM3 and the fourth dichroic mirror DM4. The second color signal light may be reflected by the third dichroic mirror DM3 and then may be transmitted through the fourth dichroic mirror DM4. The third color signal light may be reflected by the fourth dichroic mirror DM4.

Paths of the first color signal light, the second color signal light, and the third color signal light may be combined into one optical path via the above-described mechanism.

A fourth mirror M4 may be further disposed between the first polarized beam splitter 431 and the seventh mirror M7, a fifth mirror M5 may be further disposed between the second polarized beam splitter 432 and the third dichroic mirror DM3, and a sixth mirror M6 may be further disposed between the third polarized beam splitter 433 and the fourth dichroic mirror DM4.

Combined signal light may become parallel due to a fourth objective lens OL4 and a fourth pinhole PH4. An eighth mirror M8 may be further disposed between the fourth dichroic mirror DM4 and the fourth objective lens OL4.

As reference light and signal light interfere with each other, a hologram pattern HP may be recorded on a substrate SUB. In the above method, holograms may be recorded by simultaneously using the first, second, and third color light sources 411, 412, and 413, or holograms may be sequentially recorded by selectively using the first, second, and third color light sources 411, 412, and 413.

The hologram recording apparatus 400 of FIG. 16 may record holograms on a relatively large area.

Figure 17:
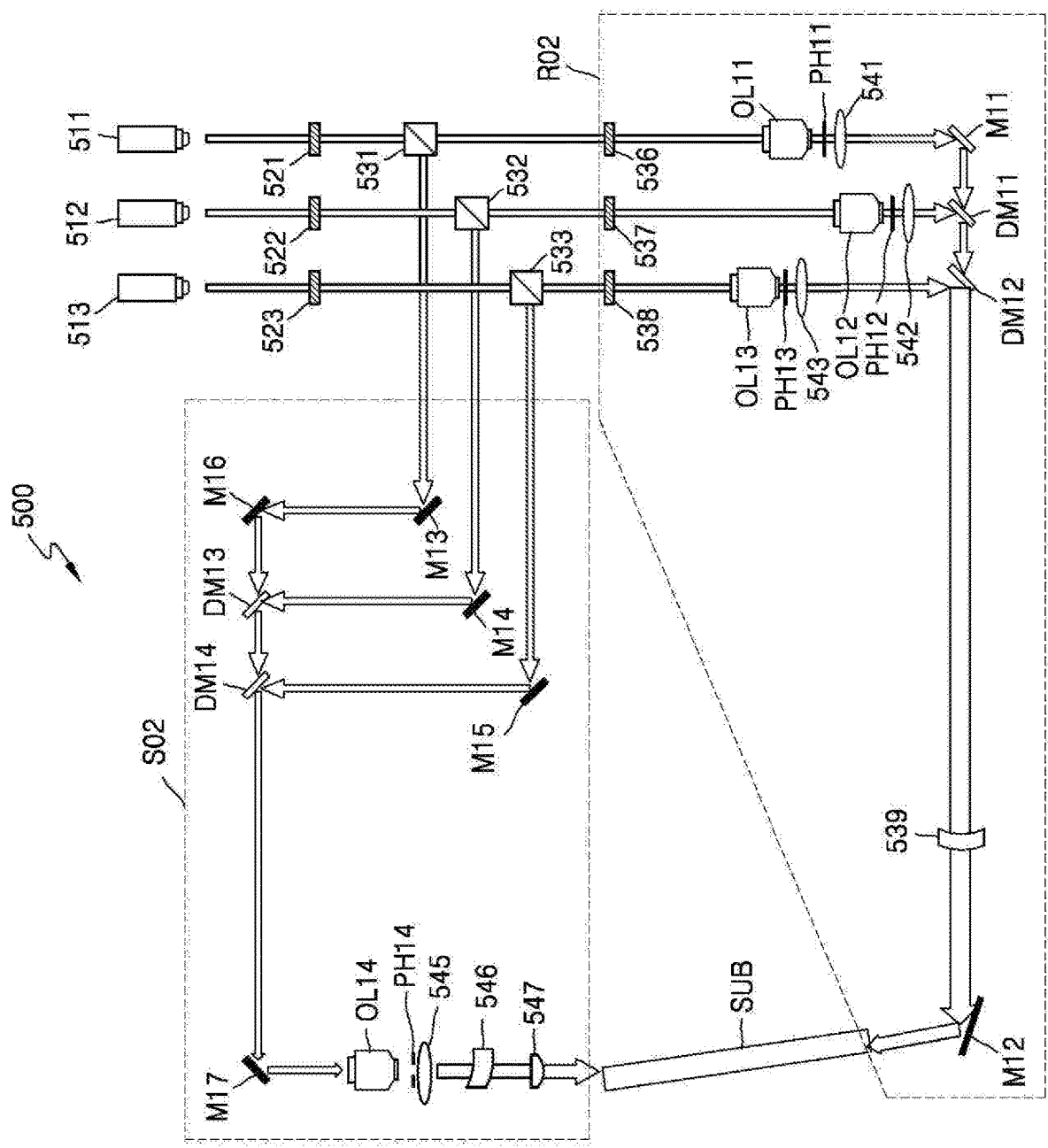
FIG. 17 is a view of a hologram recording apparatus for recording a hologram on a holographic optical element, according to another exemplary embodiment.

FIG. 17 is a view of a hologram recording apparatus 500, according to another exemplary embodiment. The hologram recording apparatus 500 may record holograms on an area which is smaller than the relatively large area of the hologram recording apparatus 400 of FIG. 16.

The hologram recording apparatus 500 may be used to form the first holographic optical element H1 of FIG. 1. Referring to FIG. 17, the hologram recording apparatus 500 may include a first color light source 511, a second color light source 512, a third color light source 513, a first polarized beam splitter 531 that splits first light emitted by the first color light source 511 in a polarization direction, a second polarized beam splitter 532 that splits second light emitted by the second color light source 512 in a polarization direction, and a third polarized beam splitter 533 that splits third light emitted by the third color light source 513 in a polarization direction. Each of the first polarized beam splitter 531, the second polarized beam splitter 532, and the third polarized beam splitter 533 may transmit first polarized light (e.g., P-polarized light) and may reflect second polarized light (e.g., S-polarized light)

Light split by each of the first polarized beam splitter 531, the second polarized beam splitter 532, and the third polarized beam splitter 533 may be used as signal light and reference light. For example, light reflected by each of the first polarized beam splitter 531, the second polarized beam splitter 532, and the third polarized beam splitter 533 may be used as signal light, and a system using the signal light may constitute a signal light system S02. Light that has propagated through each of the first polarized beam splitter 531, the second polarized beam splitter 532, and the third polarized beam splitter 533 may be used as reference light, and a system using the reference light may constitute a reference light system R02.

A first wave plate 521 may be further disposed between the first color light source 511 and the first polarized beam splitter 531, a second wave plate 522 may be further disposed between the second color light source 512 and the second polarized beam splitter 532, and a third wave plate 523 may be further disposed between the third color light source 513 and the third polarized beam splitter 533. Each of the first wave plate 521, the second wave plate 522, and the third wave plate 523 may be, for example, a quarter-wave plate, and may change a phase of light.

First color reference light that has propagated through the first polarized beam splitter 531, second color reference light that has propagated through the second polarized beam splitter 532, and third color reference light that has propagated through the third polarized beam splitter 533 may become parallel due to the use of a parallel light forming unit.

The parallel light forming unit may include, for example, any one or more of an objective lens, a pinhole, and a lens. For example, the first color reference light that has propagated through the first polarized beam splitter 531 may become parallel due to a first objective lens OL11, a first pinhole PH11, and a first lens 541. The second color reference light that has propagated through the second polarized beam splitter 532 may become parallel due to a second objective lens OL12, a second pinhole PH12, and a second lens 542. The third color reference light that has propagated through the third polarized beam splitter 533 may become parallel due to a third objective lens OL13, a third pinhole PH13, and a third lens 543. A fourth wave plate 536 may be further disposed between the first polarized beam splitter 531 and the first objective lens OL11, a fifth wave plate 537 may be further disposed between the second polarized beam splitter 532 and the second objective lens OL12, and a sixth wave plate 538 may be further disposed between the third polarized beam splitter 533 and the third objective lens OL13.

A first mirror M11, a first dichroic mirror DM11, and a second dichroic mirror DM12 may be arranged so as to combine paths of the first color reference light, the second color reference light, and the third color reference light that are parallel to one another into one optical path. The first mirror M11, the first dichroic mirror DM11, and the second dichroic mirror DM12 may be aligned. The first dichroic mirror DM11 and the second dichroic mirror DM12 may reflect predetermined wavelength ranges of light and may transmit other wavelength ranges of light. For example, the first dichroic mirror DM11 may reflect second color light and may transmit first color light and third color light. The second dichroic mirror DM12 may reflect the third color light and may transmit the first color light and the second third color light.

The first color reference light may be reflected by the first mirror M11 and then may be transmitted through the first dichroic mirror DM11 and the second dichroic mirror DM12. The second color reference light may be reflected by the first dichroic mirror DM11 and then may be transmitted through the second dichroic mirror DM12. The third color reference light may be reflected by the second dichroic mirror DM12.

Paths of the first color reference light, the second color reference light, and the third color reference light may be combined into one optical path via the above-described mechanism. Combined light may have a cross-sectional area that expands in one direction. A concave cylindrical lens 539 may be further disposed next to the second dichroic mirror DM12. Also, a second mirror M12 for changing an optical path may be further disposed next to the concave cylindrical lens 545.

A system using first, second, and third reference light which have respectively propagated through the first polarized beam splitter 531, the second polarized beam splitter 532, and the third polarized beam splitter 533 may constitute the reference light system R02.

A system using first, second, and third signal light respectively reflected by the first polarized beam splitter 531, the second polarized beam splitter 532, and the third polarized beam splitter 533 may constitute the signal light system S02.

A sixth mirror M16, a third dichroic mirror DM13, and a fourth dichroic mirror DM14 may be aligned so as to combine paths of first color signal light reflected by the first polarized beam splitter 531, second color signal light reflected by the second polarized beam splitter 532, and third color signal light reflected by the third polarized beam splitter 533 into one optical path.

The third dichroic mirror DM13 may reflect second color light and may transmit first color light and third color light. The fourth dichroic mirror DM14 may reflect the third color light and may transmit the first color light and the second color light.

The first color signal light may be reflected by the sixth mirror M16 and then may be transmitted through the third dichroic mirror DM13 and the fourth dichroic mirror DM14. The second color signal light may be reflected by the third dichroic mirror DM13 and then may be transmitted through the fourth dichroic mirror DM14. The third color signal light may be reflected by the fourth dichroic mirror DM14.

Paths of the first color signal light, the second color signal light, and the third color signal light may be combined into one optical path via the above-described mechanism. A third mirror M13 may be further disposed between the first polarized beam splitter 531 and the sixth mirror M16, the fourth mirror M14 may be further disposed between the second polarized beam splitter 532 and the third dichroic mirror DM13, and a fifth mirror M15 may be further disposed between the third polarized beam splitter 533 and the fourth dichroic mirror DM14.

Combined signal light may become parallel due to a fourth objective lens OL14 and a fourth pinhole PH14. A seventh mirror M17 may be further disposed between the fourth dichroic mirror DM14 and the fourth objective lens OL14.

At least one lens for focusing the parallel light in one direction may be further included. For example, a concave cylindrical lens 546 and a convex cylindrical lens 547 may be further disposed next to a fifth lens 545.

As reference light and signal light interfere with each other, the hologram pattern HP may be recorded on an area of the substrate SUB that is expanded in one direction. In the above-described method, holograms may be recorded by simultaneously using the first, second, and third color light sources 511, 512, and 513, or holograms may be sequentially recorded by selectively using the first, second, and third color light sources 511, 512, and 513.

Figure 18:
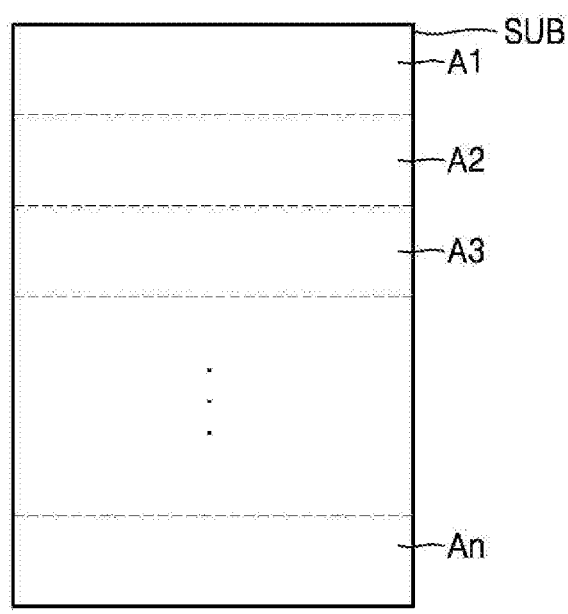
FIG. 18 is a view of a hologram recording method of recording a hologram on a holographic optical element, according to an exemplary embodiment.

In order to record holograms, the substrate SUB may be divided into a plurality of areas A1, A2, A3, . . . , and An, and holograms may be recorded by sequentially exposing the plurality of areas A1, A2, A3, . . . , and An as shown in FIG. 18. Accordingly, power of color light sources used to record the holograms may be efficiently used. Since a blue light source has a relatively small power and a relatively low light efficiency as compared with other color light sources, when holograms are simultaneously recorded on a large area, sufficient power may not be guaranteed. In this case, when holograms are recorded by dividing an area, uniform light efficiency may be obtained and holograms may be recorded with high optical power density. Diffraction efficiency of a hologram recording medium may increase as optical power density increases.

Figure 19:
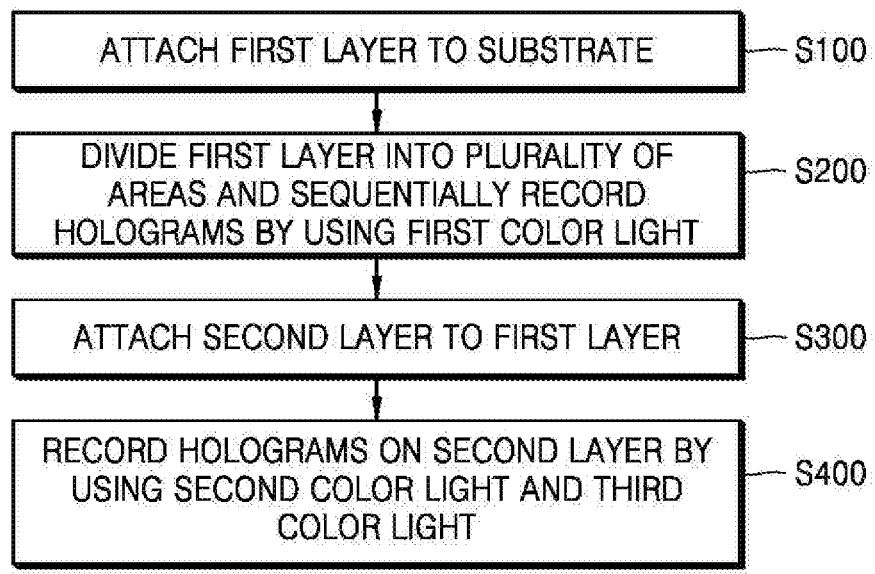
FIG. 19 is a flowchart of a method of manufacturing a holographic optical element, according to an exemplary embodiment.

Referring to FIG. 19, a method of manufacturing a holographic optical element according to an exemplary embodiment may include operation S100 in which a first layer is attached to a substrate and operation S200 in which the first layer is divided into a plurality of areas and holograms are sequentially recorded by using light of a first color. A method of exposing the plurality of areas as described above with reference to FIG. 18 may be used in this case. Holograms may be recorded by using a hologram recording method as described above with reference to FIG. 16 or FIG. 17.

Next, in operation S300, a second layer may be attached to the first layer. In operation S400, holograms may be recorded on the second layer by using light of a second color and light of a third color. Alternatively, a hologram may be recorded on the second layer by using the light of the second color, a third layer may be attached to the second layer, and a hologram may be recorded on the third layer by using the light of the third color.

Pre-exposure may be performed by using a light source having low coherence before exposure of signal light and reference light, and then holograms may be recorded by using the signal light and the reference light. Accordingly, diffraction intensity of the signal light and the reference light may increase.

Figure 20:
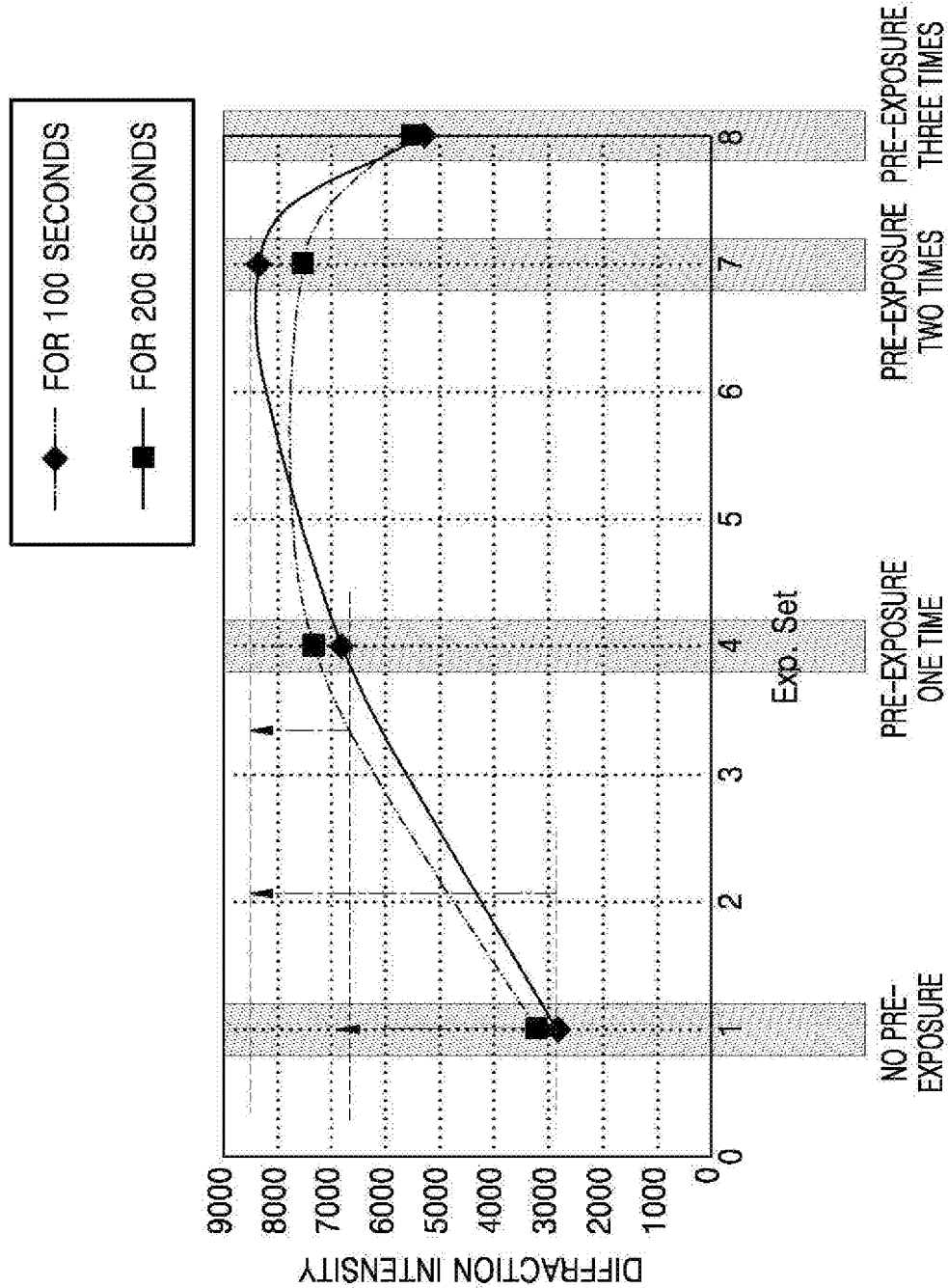
FIG. 20 is a graph showing a relationship between diffraction intensity of a holographic optical element and pre-exposure.

FIG. 20 is a graph showing a relationship between diffraction efficiency of a hologram pattern and pre-exposure. A dashed line corresponds to a case in which pre-exposure is performed for 100 seconds, and a solid line corresponds to a case in which pre-exposure is performed for 200 seconds. Diffraction intensity increases when pre-exposure is performed one or two times.

A backlight device according to an exemplary embodiment may be applied to a holographic display, a mobile phone, or a 3D TV.

While exemplary embodiments have been described with reference to the figures, it will be understood by persons having ordinary skill in the art that various changes in form and details may be made therein without departing from the spirit and scope as defined by the following claims.

What is claimed is:

1. A backlight device comprising:
a light source configured to emit light;
a light guide plate configured to guide the light emitted by the light source which is provided on a lower side of the light guide plate;
a first holographic optical element provided on an upper side of the light guide plate, configured to expand light that has propagated through the light guide plate, and comprising layers of a multi-layered structure that are separated according to a wavelength of the light; and
a second holographic optical element provided on a third side of the light guide plate that is perpendicular to the second side and configured to concentrate light reflected by the first holographic optical element,
wherein the layers of the multi-layered structure are configured to respectively respond to different wavelengths of the light, and
wherein each layer of the multi-layered structure comprises a holographic pattern based on the wavelength of the light the layer is responsive to,
wherein the layers of the multi-layered structure of the first holographic optical element comprise a first layer configured to respond to blue light and a second layer configured to respond to each of green light and red light.

2. The backlight device of claim 1, wherein the light source comprises one from among a laser and a light-emitting diode.

3. The backlight device of claim 1, further comprising at least one optical path converter configured to change a path of the light emitted by the light source.

4. The backlight device of claim 1, further comprising an optical deflector configured to change a direction in which the light emitted by the light source is incident on the light guide plate.

5. The backlight device of claim 1, further comprising an eye-tracking device configured to track at least one position of at least one pupil of a user.

6. A backlight device comprising:
a first light source configured to emit first light;
a second light source configured to emit second light;
a light guide plate configured to guide the first light emitted by the first light source and the second light emitted by the second light source;
a holographic optical element provided on a surface of the light guide plate at a first side of the light guide plate; and
an optical element provided on a second side of the light guide plate opposite to a third side of the light guide plate at which the first and second light sources are provided, the optical element being configured to cause the first light emitted by the first light source and the second light emitted by the second light source to expand and be incident on the holographic optical element,
wherein the holographic optical element is configured to concentrate the first light and the second light on at least two points based on angles at which rays of the first light and rays of the second light are reflected by the holographic optical element,
wherein the optical element comprises a prism, and
wherein the first light and the second light are directly incident on the prism without passing through the light guide plate.

7. The backlight device of claim 6, wherein the first and the second light sources comprise one from among a laser and a light-emitting diode.

8. The backlight device of claim 6, wherein a thickness of the light guide plate is smaller than a thickness at an incident surface of the prism.

9. The backlight device of claim 6, further comprising at least one optical path converter configured to change a path of the first light emitted by the first light source or the second light emitted by the second light source.

10. The backlight device of claim 6, further comprising an optical deflector configured to change a direction in which the first light emitted by the first light source or the second light emitted by the second light source is incident on the light guide plate.

11. The backlight device of claim 6, further comprising an eye-tracking device configured to track at least one position of at least one pupil of a user.

12. A holographic display comprising:
a light source configured to emit light;
a light guide plate configured to guide the light emitted by the light source which is provided on a lower side of the light guide plate;
a first holographic optical element provided on an upper side of the light guide plate, configured to expand light that has propagated through the light guide plate, and comprising layers of a multi-layered structure that are each configured to respond to a wavelength of the light;
a second holographic optical element provided on a third side of the light guide plate that is perpendicular to the second side and configured to concentrate light reflected by the first holographic optical element; and
a display panel configured to display an image by using light that has propagated through the light guide plate from the second holographic optical element, and
wherein the layers of the multi-layered structure are configured to respectively respond to different wavelengths of the light, and in that each layer of the multi-layered structure comprises a holographic pattern based on the wavelength of the light the layer is responsive to,
wherein the layers of the multi-layered structure of the first holographic optical element comprise a first layer configured to respond to blue light and a second layer configured to respond to each of green light and red light, and
wherein a first optical deflector and a second optical deflector are provided between the light guide plate and the display panel.

13. A holographic display comprising:
a first light source configured to emit first light;
a second light source configured to emit second light;
a light guide plate configured to guide the first light emitted by the first light source and the second light emitted by the second light source;
a holographic optical element provided on a surface of the light guide plate at a first side of the light guide plate;
an optical element provided on a second side of the light guide plate opposite to a third side of the light guide plate at which the first and the second light sources are provided, the optical element being configured to cause the first light from the first light source and the second light from the second light source to expand and be incident on the holographic optical element; and
a display panel configured to display an image by using light that has propagated through the light guide plate from the holographic optical element, wherein the holographic optical element is configured to focus the light on at least two points based angles at which rays of the first light and rays of the second light are reflected by the holographic optical element, wherein the optical element comprises a prism, and wherein the first light and the second light are directly incident on the prism without passing through the light guide plate.

14. A backlight device comprising:

a first light source configured to emit first light;

a second light source configured to emit second light;

each of the first light source and the second light source comprises a plurality of color light sources configured to emit light in different wavelength ranges;

a light guide plate configured to guide each of the first light emitted by the first light source and the second light emitted by the second light source toward a holographic optical element which is disposed on a side of the light guide plate;

the holographic optical element that includes at least two layers that correspond to respective ranges of wavelengths of light, the holographic optical element being configured to concentrate the first light and the second light that is incident thereon on at least two points based angles at which rays of the first light and rays of the second light are reflected by an optical element comprising a prism, wherein the optical element is provided on a first side of the light guide plate opposite to a second side of the light guide plate at which the first and the second light source are provided, and wherein the first light and the second light are directly incident on the prism without passing through the light guide plate.

15. The backlight device of claim 14, wherein the each of the first light source and the second light source comprises at least one from among a laser and a light-emitting diode.

16. The backlight device of claim 14, further comprising at least one optical path converter configured to change a path of a corresponding one from among the light emitted by the first light source and the light emitted by the second light source.

17. The backlight device of claim 14, further comprising at least one optical deflector configured to change a direction in which at least one from among the light emitted by the first light source and the light emitted by the second light source is incident on the light guide plate.

18. The backlight device of claim 14, further comprising an eye-tracking device configured to track at least one position of at least one pupil of a user.

19. The backlight device of claim 18, wherein positions of the rays of the first light and the rays of the second light are determined based on the at least one position of the at least one pupil of the user tracked by the eye-tracking device.

20. The backlight device of claim 18, wherein the at least two points comprises a first viewing point corresponding to a right eye and a second viewing point corresponding to a left eye.

* * * * *